United States Patent
Dean et al.

(10) Patent No.: US 6,941,293 B1
(45) Date of Patent: Sep. 6, 2005

(54) METHODS AND APPARATUS FOR DETERMINING EQUIVALENT DESCRIPTIONS FOR AN INFORMATION NEED

(75) Inventors: Jeffrey A. Dean, Menlo Park, CA (US); Georges Harik, Mountain View, CA (US); Benedict Gomes, Berkeley, CA (US); Noam Shazeer, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 404 days.

(21) Appl. No.: 10/062,110

(22) Filed: Feb. 1, 2002

(51) Int. Cl.[7] .......................... G06F 7/00; G06F 17/30
(52) U.S. Cl. .......................... 707/3; 707/4; 707/5
(58) Field of Search .................... 707/3, 4, 5

(56) References Cited

U.S. PATENT DOCUMENTS

| | | | | |
|---|---|---|---|---|
| 5,404,514 A | * | 4/1995 | Kageneck et al. | 707/5 |
| 5,442,778 A | * | 8/1995 | Pedersen et al. | 707/5 |
| 5,488,725 A | * | 1/1996 | Turtle et al. | 707/5 |
| 5,659,742 A | * | 8/1997 | Beattie et al. | 707/104.1 |
| 5,819,260 A | * | 10/1998 | Lu et al. | 707/3 |
| 6,006,221 A | * | 12/1999 | Liddy et al. | 707/5 |
| 6,741,981 B2 | * | 5/2004 | McGreevy | 707/3 |
| 2003/0115191 A1 | * | 6/2003 | Copperman et al | 707/3 |

* cited by examiner

*Primary Examiner*—Frantz Coby
*Assistant Examiner*—Cindy Nguyen
(74) *Attorney, Agent, or Firm*—John C. Pokotylo; Straub & Pokotylo (57) ABSTRACT

Methods and apparatus determine equivalent descriptions for an information need. In one implementation, if adjacent entries in a query log contain common terms, the uncommon terms are identified as a candidate pair. The candidate pairs are assigned a score based on their frequency of occurrence, and pairs having a score exceeding a defined threshold are determined to be synonyms.

27 Claims, 8 Drawing Sheets

| Query ID | UserID | Date/Time | Query |
|---|---|---|---|
| 1 | 2 | 2/13/01 5:15 | palo alto hotels |
| 2 | 2 | 2/13/01 5:20 | palo alto inns |
| 3 | 2 | 2/13/01 5:23 | san francisco inns |
| 4 | 2 | 2/13/01 5:35 | travel |
| 5 | 1 | 2/14/01 17:15 | fda |
| 6 | 1 | 2/14/01 17:17 | food drug administration |
| 7 | 3 | 2/10/01 9:53 | san francisco hotels |
| 8 | 3 | 2/10/01 9:54 | san francisco inns |
| 9 | 3 | 2/11/01 2:07 | palo alto inns |

METHODS AND APPARATUS FOR DETERMINING EQUIVALENT DESCRIPTIONS FOR AN INFORMATION NEED

BACKGROUND OF THE INVENTION

A. Field of the Invention

The present invention relates generally to information search and retrieval and, more particularly, to determining equivalent descriptions for an information need based on multiple references to that same information need.

B. Description of Related Art

The World Wide Web ("web") contains a vast amount of information. Locating a desired portion of the information, however, can be challenging. Unless the user is aware of the specific location of the desired information, the user must rely on a service to assist in locating the information. Typically, the user will identify the information sought via a query of some form, and the service will attempt to direct the user to the information based on the query.

Unfortunately, however, the user cannot always formulate the query in a sufficient manner as to obtain all of the information that the user desires. For example, the user may have an information need that can be described in multiple ways, but the user may only be aware of a limited way of describing that information need. In such a case, the user may obtain only a subset of the desired information.

It would be helpful, therefore, to have methods and apparatus for determining equivalent ways of describing an information need.

SUMMARY OF THE INVENTION

Systems and methods consistent with the present invention address this and other needs by determining equivalent descriptions for an information need based on multiple references to that same information need.

In one implementation consistent with the present invention, a method for determining equivalent descriptions for an information need involves identifying a list of queries issued by one or more users. A candidate pair of equivalent descriptions is identified by locating two queries that refer to the same information need. A score is calculated for the candidate pair, depending on the frequency with which the candidate pair occurs in the list. If the score exceeds a defined threshold, each half of the candidate pair is determined to be an equivalent description for the information need.

In another implementation consistent with the present invention, a method for determining synonyms includes obtaining a list of search queries issued by one or more users. The list is sorted first by user and second by the time when the query was issued. A set of adjacent queries for a single user is selected and, from this set, two queries are identified that contain at least one query term in common. A candidate synonym pair is identified based on the uncommon portions of the two queries, and a score is calculated for it based on the frequency with which the candidate synonym pair occurs in the list. If the score exceeds a defined threshold, each half of the candidate synonym pair is determined to be a synonym of the other half.

Additional aspects of the present invention are directed to computer systems and to computer-readable media having features relating to the foregoing aspects.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

The present invention analyzes collections of descriptions to identify those that relate to the same information need. In one implementation, these descriptions are in the form of search queries issued to a search engine, which are then organized by user and by date. Queries within a certain adjacency level are analyzed to determine if they contain one or more terms in common. If they do, the uncommon terms are considered a candidate pair of equivalent descriptions for the same information need. Scores are calculated for the candidate pairs based on the frequency with which they appear in the collection, and those above a certain threshold are determined to be equivalent. Those skilled in the art will recognize that many other implementations are possible, consistent with the present invention.

A. Environment and Architecture

Figure 1:
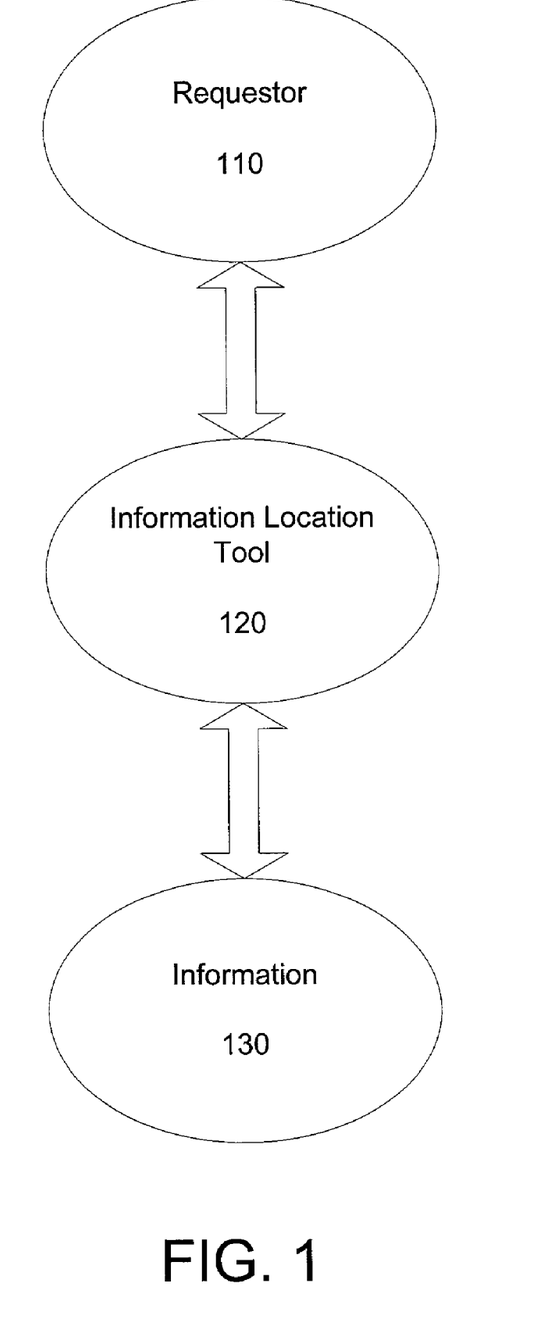
FIG. 1 is a diagram illustrating an environment in which the present invention may be implemented.

FIG. 1 is a diagram illustrating an environment in which the present invention may be implemented. The environment includes a requester 110, an information location tool 120, and information set 130.

Information set 130 represents the collection of information available for access. This information set 130 may be, for example, hypertext pages available over the Internet, or any other collection of documents or other information.

Requestor 110 represents an entity that is seeking to locate a subset of information set 130. Because the collection of information set 130 may be vast, requestor 110 may employ the aid of an information location tool 120.

Information location tool 120 facilitates finding information within information set 130. As described in more detail below in reference to FIG. 2, information location tool 120 analyzes information set 130 to develop an index. Information location tool 120 receives a request for information from requestor 110, compares the request to its index, and provides requestor 110 with pointers to the relevant portions of information set 130.

Figure 2:
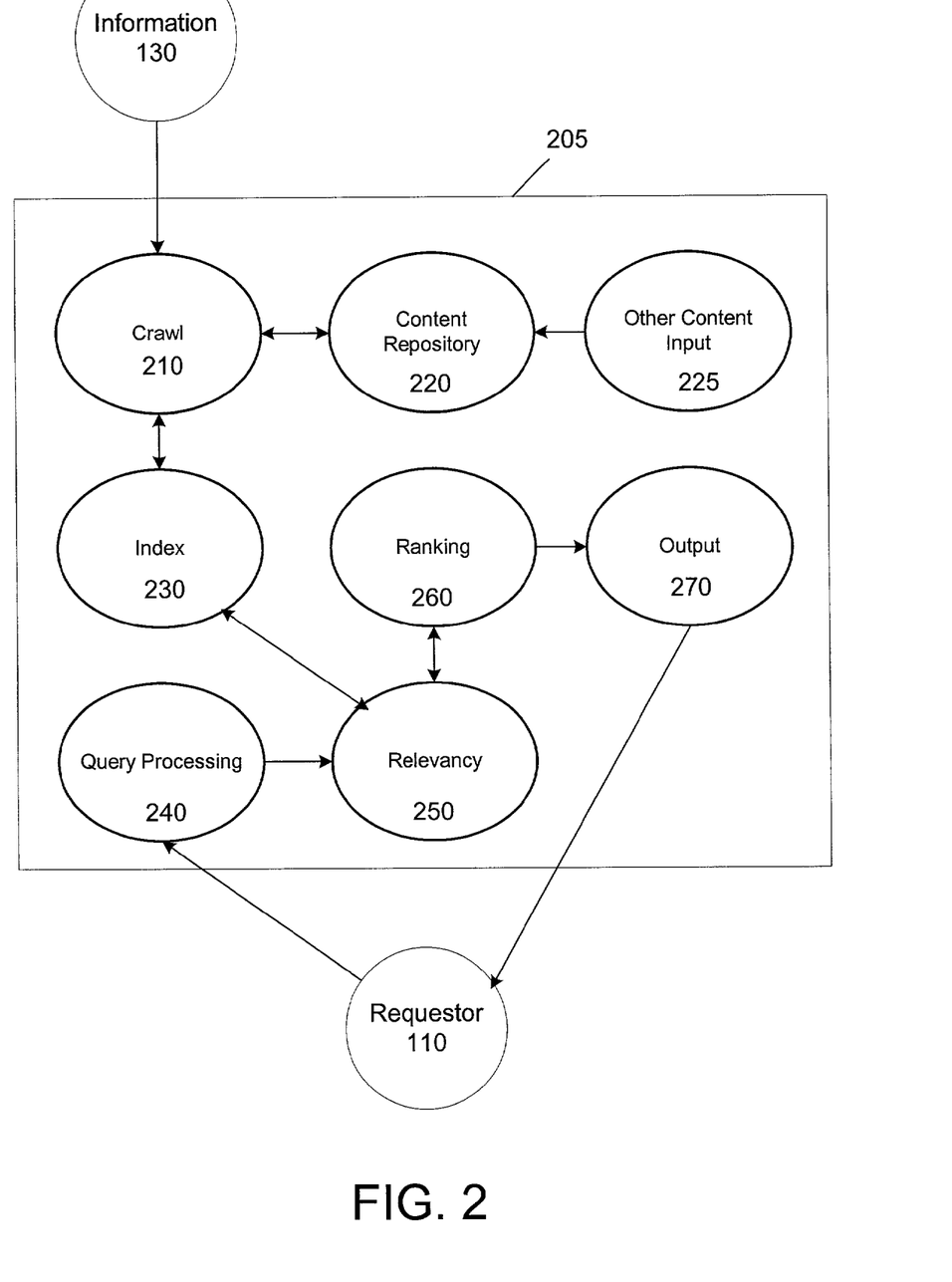
FIG. 2 is a diagram illustrating a search engine consistent with the present invention.

FIG. 2 is a diagram illustrating an information location tool 120 consistent with the present invention. In this implementation, information location tool 120 is a search engine 205. Search engine 205 may include a crawl component 210, a content repository 220, a content input component 225, an index 230, a query processing component 240, a relevancy component 250, an ordering component 260, and an output component 270.

Crawl component 210 analyzes and collects information from information set 130 and places the information into content repository 220. In an implementation involving the world wide web, for example, crawl component 210 locates web pages, collects them, and stores them in content repository 220. In addition to information stored by crawl component 210, the content repository 220 may also include information manually entered into (or otherwise located by) content input component 225.

Index 230 represents a distillation of the information stored in content repository 220. Much like an index to a book allows a user to locate information within the book much faster than analyzing each page of the book, index 230 facilitates location of desired information from information set 130. Index 230 may be implemented as a series of associations of (1) terms (e.g., words) and (2) the documents within which those terms appear. In addition to the documents associated with a particular term, index 230 may also contain information such as the location of the term within a given document, the number of times the term appeared in a given document, etc.

Query processing component 240 receives information requests from a requestor 110. Query processing component 240 may analyze the information requests to understand better what information the requestor 110 seeks. Particularly salient to the present invention, query processing component 240 may determine equivalent descriptions for the information need sought by requestor 110. Query processing component 240 may also perform functions such as detecting and correcting misspellings, transforming the information request into a format that is more likely to produce the desired information, when processed by the remainder of search engine 205, etc.

Relevancy component 250 receives the (perhaps modified) information request from query processing component 240, and determines the items within information set 130 that are relevant to the information request. This may be accomplished, for example, by comparing the terms of the information request with index 230.

Ordering component 260 receives a list of relevant items from relevancy component 250 and determines the order in which they should be presented. Typically, the relevant items will be ordered in a manner that maximizes the likelihood that the items most likely to be of interest to the user appear first. One example of an ordering system is described in S. Brin, L. Page: The Anatomy of a Large-Scale Hypertextual Web Search Engine, WWW7/Computer Networks 30(1–7): 107–117 (1998).

Output component 270 receives an ordered list of items from ordering component 260, formats that list in a manner suitable for presenting to requester 110, and provides the ordered list to requester 110.

Figure 3:
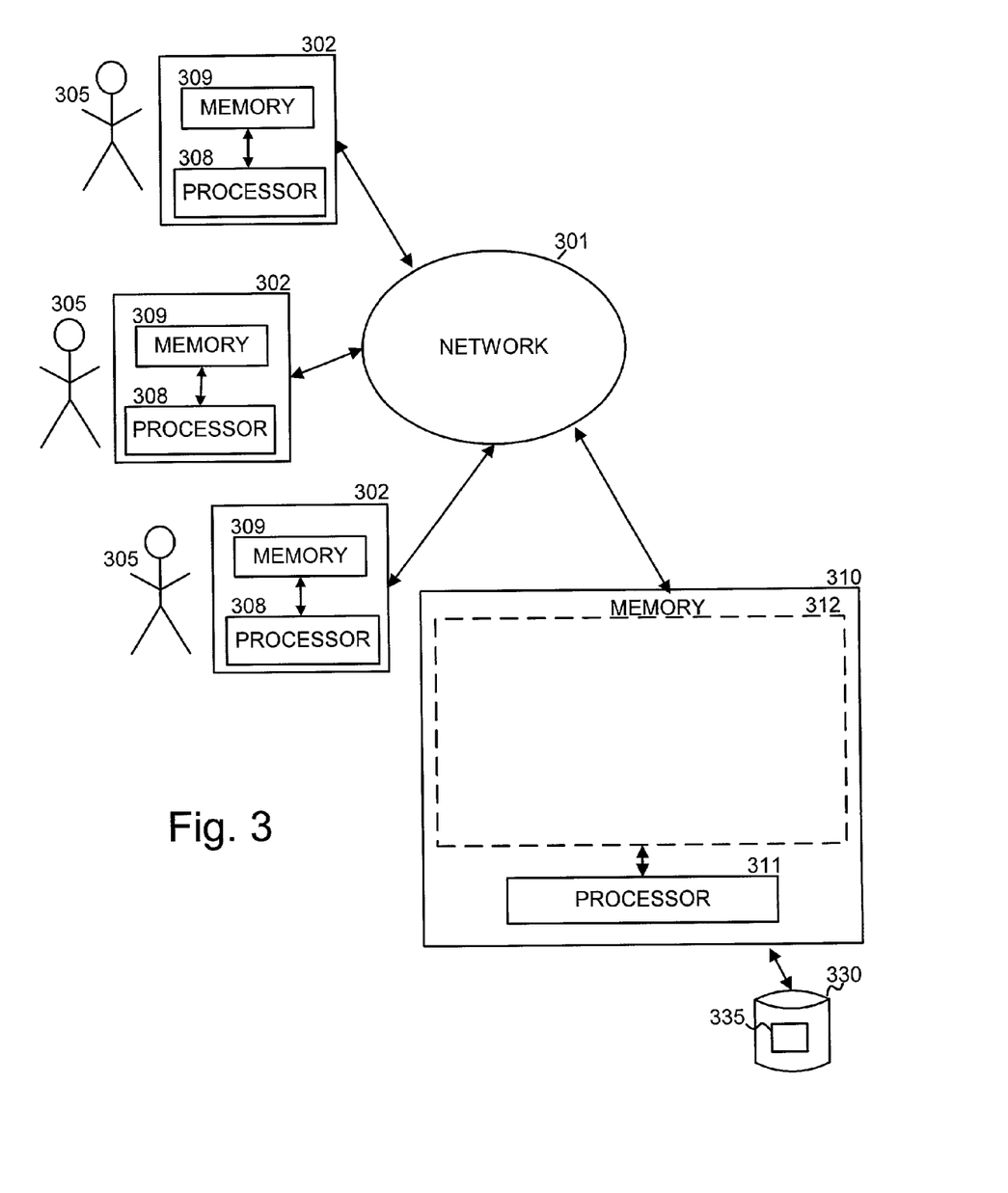
FIG. 3 is a diagram illustrating an architecture in which the present invention may be implemented.

FIG. 3 is a diagram illustrating an architecture in which the present invention may be implemented. The architecture includes multiple client devices 302, a server device 310, and a network 301, which may be, for example, the Internet. Client devices 302 each include a computer-readable medium 309, such as random access memory, coupled to a processor 308. Processor 308 executes program instructions stored in memory 309. Client devices 302 may also include a number of additional external or internal devices, such as, without limitation, a mouse, a CD-ROM, a keyboard, and a display.

Through client devices 302, requestors 110 can communicate over network 301 with each other and with other systems and devices coupled to network 301, such as server device 310.

Similar to client devices 302, server device 310 may include a processor 311 coupled to a computer readable memory 312. Server device 310 may additionally include a secondary storage element, such as database 330.

Client processors 308 and server processor 311 can be any of a number of well known computer processors, such as processors from Intel Corporation, of Santa Clara, Calif. In general, client device 302 may be any type of computing platform connected to a network and that interacts with application programs, such as a digital assistant or a "smart" cellular telephone or pager. Server 310, although depicted as a single computer system, may be implemented as a network of computer processors.

Memory 312 may contain a number of programs, such as the components described above in reference to FIG. 2.

B. Operation

Figure 4:
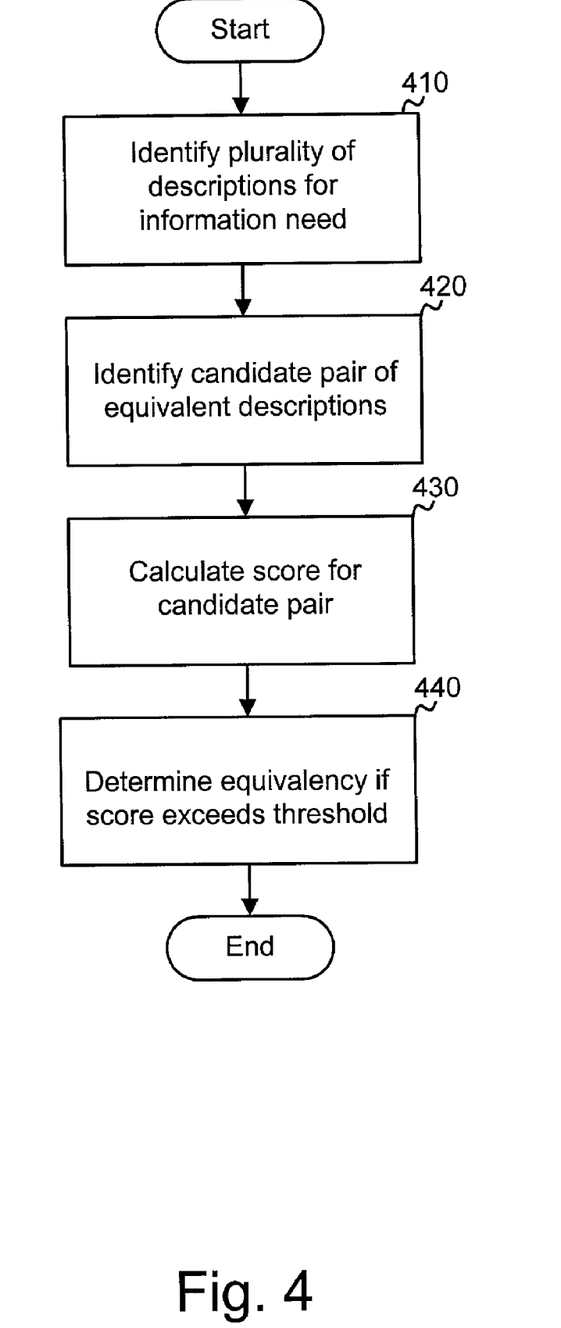
FIG. 4 is a flow diagram for identifying equivalent descriptions for an information need, consistent with the present invention.

FIG. 4 is a flow diagram for identifying equivalent descriptions for an information need, consistent with the present invention. The process begins by identifying a plurality of descriptions that are associated with a plurality of information needs, which collection of descriptions will hereafter be referred to as the "Data Set". (Stage 410). The plurality of descriptions may be in the form of search requests, as explained below in reference to FIG. 5, or a variety of other forms. For purpose of the present invention, all that is required is that there be descriptions of some form, and that each description be associated with one or more information needs.

Next, candidate pairs of equivalent descriptions are identified. (Stage 420). This may be accomplished by analyzing descriptions that are related in some manner. For example, if two descriptions contain a common term, one might deduce that they are related in some manner. In particular, one might deduce that the two descriptions are equivalent, or that the terms that are not in common are equivalent. Similarly, if two descriptions explicitly point to the same piece of information, one might deduce they are related in some manner.

A score is then calculated for each candidate pair. (Stage 430). The score may be calculated in an absolute manner (e.g., by determining the frequency with which the candidate pair occurs in the Data Set), relative to other candidate pairs (e.g., by determining how frequently the candidate pair occurs relative to other candidate pairs), or in a variety of other manners.

The scores may then be compared against some threshold to determine whether the candidate pair is an equivalent description for the information need. (Stage 440). The threshold may be set depending on the confidence required in the outcome.

Figure 5:
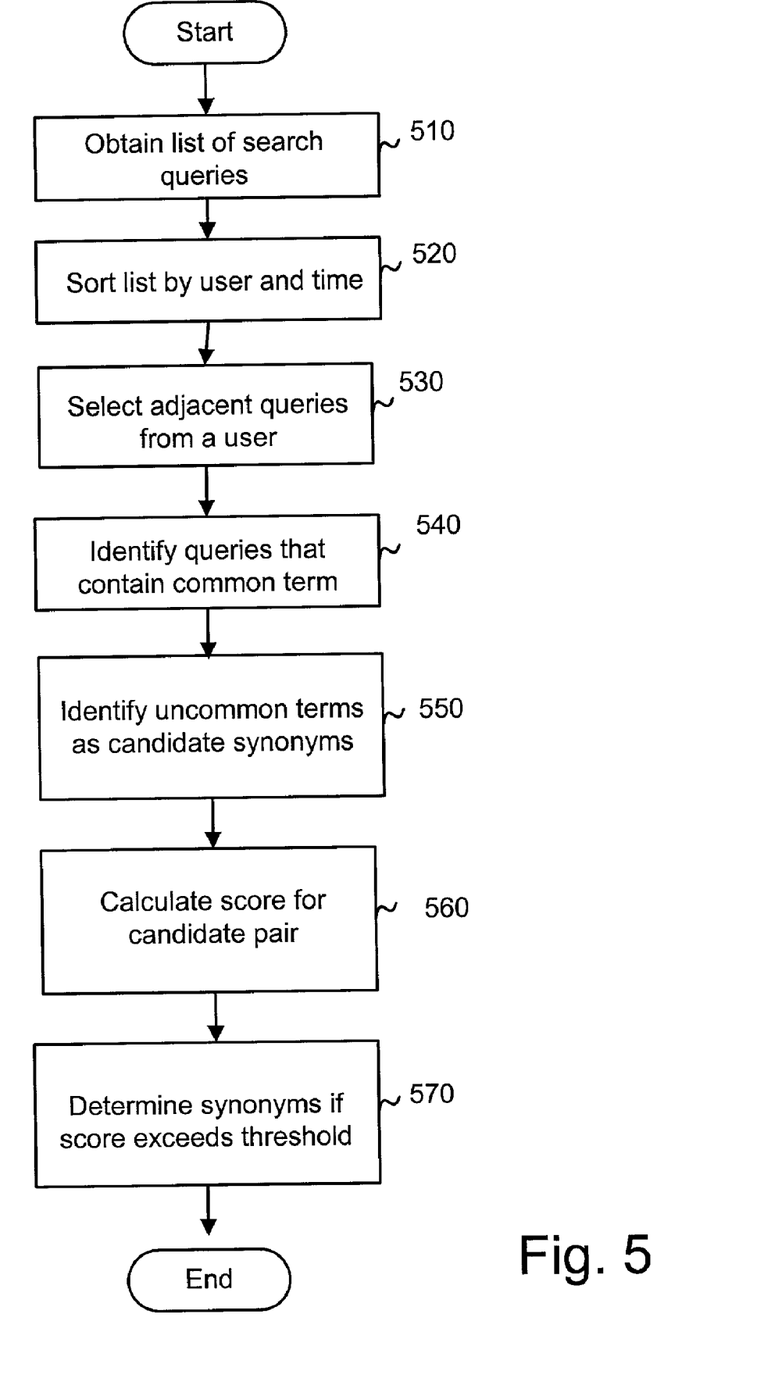
FIG. 5 is a flow diagram for identifying synonyms based on a search query log, consistent with the present invention.

FIG. 5 is a flow diagram for identifying synonyms based on a search query log, consistent with the present invention. In this implementation, the process begins by obtaining a list of search queries—e.g., a query log. (Stage 510). The query log may be maintained, for example, in the query processing component 240 of search engine 205.

Figure 6:
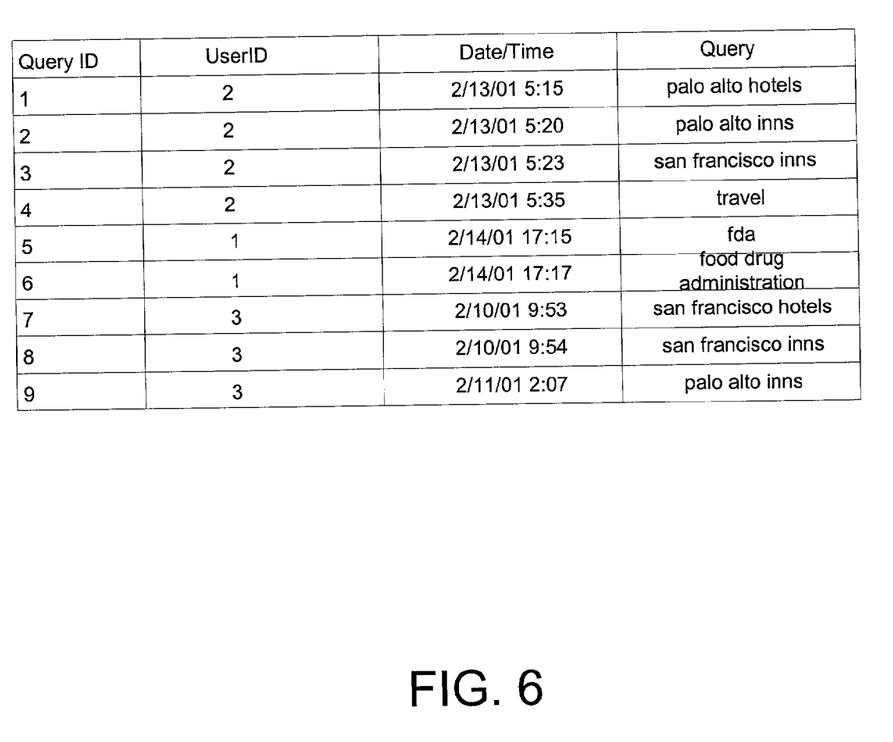
FIG. 6 is a sample query log consistent with the present invention.

An exemplary portion of a hypothetical query log is shown in FIG. 6. In a preferred implementation, the query log contains, for each query, information about the user who submitted the query (i.e., a UserID), when the query was submitted (i.e., date and time), and the query itself. In addition to the foregoing, the query log may also include a list of information that was provided to the user in response, a record of any action taken by the user on the search results (e.g., whether the user clicked on any of the results), as well as other data concerning the query and user behavior.

The query log may then be sorted by user and by time. (Stage 520). For example, FIG. 6 shows queries submitted by three different users, represented as UserIDs 2, 1, and 3. As shown in FIG. 6, these queries are grouped by the UserID and are further ordered based on when they were submitted by the user.

Next, a set of adjacent queries are selected. (Stage 530). The scope of this selection can be limited to a particular user, can span a certain time frame, or limited in any other manner. For exemplary purposes, we will assume that the scope is limited by selecting a set of two consecutive queries issued by the same user. Under this assumption, the adjacent queries are as follows: 1 and 2; 2 and 3; 3 and 4; 5 and 6; 7 and 8; and 8 and 9. In practice, a window of two or five consecutive queries by the same user has been found to work well.

The selected queries are analyzed to determine if they contain one or more terms in common. (Stage 540). Using the example log in FIG. 6, it may be determined that the following adjacent queries contain at least one term in common (with the common term(s) stated in parentheticals): 1 and 2 ("palo alto"); 2 and 3 ("inns"); 7 and 8 ("san francisco"); and 8 and 9 ("inns").

The portions of these queries that are not in common are then identified as a candidate pair of equivalent descriptions for the same information need. (Stage 550). Continuing with the same example: "hotels"→"inns" is determined as a candidate pair from queries 1 and 2; "palo alto"→"san francisco" is determined as a candidate pair from queries 2 and 3; "hotels"→"inns" is determined as a candidate pair from queries 7 and 8; and "san francisco"→"palo alto" is determined as a candidate pair from queries 8 and 9.

As an alternative to using common terms to identify candidate pairs, the present invention may also be used to identify candidate pairs based on acronyms. This could be accomplished, for example, by comparing the letters of a term in one query with the first letters of terms in another query. For example, the query log in FIG. 6 shows a term "FDA" as query 5, and the terms "Food Drug Administration" as query 6. By comparing the letters of query 5 to the first letters of the terms of query 6, one might determine that "FDA"→"Food Drug Administration" is a candidate pair. Indeed, the terms in the subsequent query need not be adjacent, so that FDA could be mapped to "Food and Drug Administration".

Next, a score is calculated for each candidate pair. (Stage 560). In one implementation, the score is calculated as transform/A, where "transform" represents a candidate pair and "A" represents the total number of times the first half of the candidate pair occurs in the Data Set. Under this implementation, for example, the score for the candidate pair "palo alto"→"san francisco" would be 1 (the number of times the candidate pair appears in the Data Set) divided by 3 (the number of times "palo alto" appears in the Data Set), which yields a score of 0.333. Similarly, the score for the candidate pair "hotels→inns" would be 2/2, which yields a score of 1.0. In the foregoing examples, candidate pairs are treated as unidirectional (i.e., "palo alto"→"san francisco" is treated differently than "san francisco"→"palo alto"). Those skilled in the art will realize, however, that bi-directional candidate pairs may also be used consistent with the present invention.

The scores are then compared to a threshold value to determine whether the candidate pairs are to be treated as synonyms. (Stage 570). The threshold value can be defined in advance or in real time, depending on the confidence level desired. If the threshold is set quite high, for example, it is more likely that a candidate pair will represent synonyms if its score exceeds that threshold value. In one implementation, a threshold value of 0.1 yields suitable results, when used in combination with the scoring technique described above.

Figure 7:
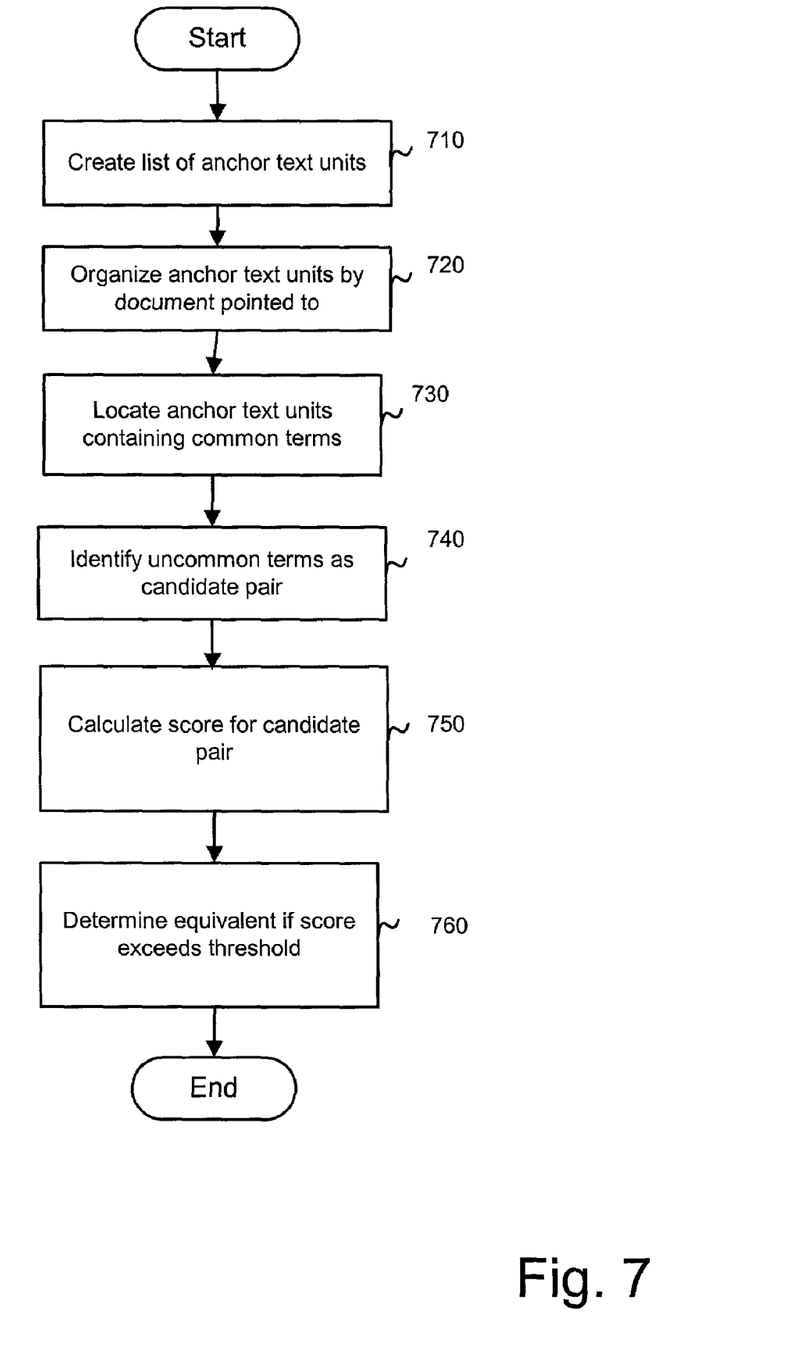
FIG. 7 is a flow diagram for identifying equivalent descriptions based on anchor text information, consistent with the present invention.

FIG. 7 is a flow diagram for identifying equivalent descriptions based on anchor text information, consistent with the present invention. For purposes of illustration, this process will be described in conjunction with the document system shown in FIG. 8, which shows three documents: A, B, C and D. Document A contains anchor text "palo alto cars", which is hyperlinked to document D, and anchor text "palo alto inns", which is hyperlinked to document C. Document B contains anchor text "san francisco inns", which is also hyperlinked to document C. Document D presumably contains information about palo alto cars, while document C presumable contains information about palo alto inns and san francisco inns.

The process begins by creating (or identifying) a list of anchor text units. (Stage 710). Using FIG. 8, for example, the list would consist of "palo alto cars", "palo alto inns", and "san francisco inns".

Figure 8:
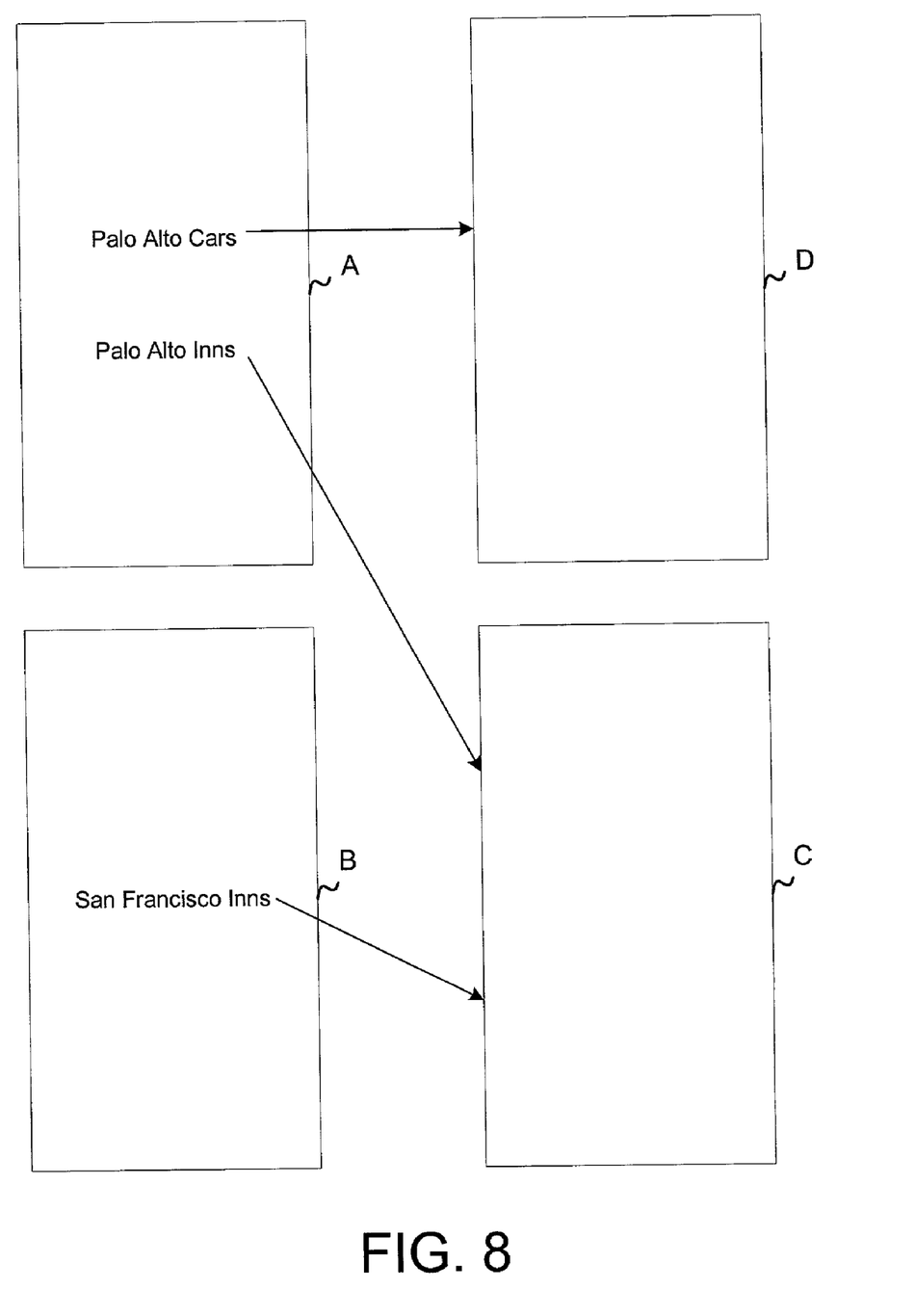
FIG. 8 is an illustrative hyperlinked document system.

The anchor text units are then organized by the document being pointed to. (Stage 720). Accordingly, "palo alto cars" would be in one set, since it points to document D; and "palo alto inns" and "san francisco inns" would be in a second set, since they each point to document C.

Within each set, anchor text units containing one or more common terms are identified (stage 730) and the uncommon parts of those units are identified as a candidate pair (stage 740). Using FIG. 8, "palo alto inns" and "san francisco inns" are identified as containing common terms (i.e., "inns"), and "palo alto"→"san francisco" (the uncommon parts) are identified as a candidate pair.

A score is calculated for each candidate pair (stage 750) and the terms of the candidate pair are treated as synonyms if the score exceeds a threshold (stage 760). The score for each candidate pair may be calculated in a variety of ways, similar to those described above in reference to FIG. 5. For example, if the score may be calculated as a ratio of the number of times the transform occurs divided by the total number of times the first half of the candidate pair occurs in the entire collection of anchor text units. Furthermore, the threshold may be set depending on the desired confidence level, also similar to that described above in reference to FIG. 5.

Finally, the present invention may be used not only to identify equivalent descriptions for an information need, but also alternative (or related) descriptions for an information need. For example, the invention may use search queries "hertz rentals" and "avis rentals" to determine that "hertz" and "avis" are equivalent (e.g., synonyms), whereas they may instead be alternatives. One way to exclude alternatives is to examine a set of information (the larger the better) to locate collections that contain one or both halves of the candidate pair. If both halves of the candidate pair occur frequently in such collections, one may deduce they are related or alternatives, rather than equivalents or synonyms.

For example, one might obtain a large set of documents that contain "hertz" and "avis". Within this set of documents, one would search for lists, tables, etc., that contain "hertz" and/or "avis". By then comparing the ratio of (1) the number of times both "hertz" and "avis" appear in a list or table, and (2) the number of times "hertz" appears in a list or table (or the number of times "avis" appears in a list or table), one can derive a score. This score can then be compared against a threshold to determine whether the halves of the candidate pair are alternatives or not.

C. Conclusion

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed:

1. A computer-implemented method for determining equivalent descriptions for an information need, comprising:
   identifying a list of queries issued by one or more users;
   identifying a candidate pair of equivalent descriptions by locating two queries that refer to the same information need;
   calculating a score for the candidate pair dependent on the frequency with which the candidate pair occurs in the list; and
   determining that each half of the candidate pair is an equivalent description for the information need if the score calculated for the candidate pair is above a defined threshold value.

2. The computer-implemented method of claim 1, wherein identifying a candidate pair comprises:
   locating two queries that contain at least one term in common; and
   identifying as a candidate pair the portions of the two queries that are not in common.

3. The computer-implemented method of claim 1, wherein identifying a candidate pair comprises:
   identifying, in a first description, a term T1 having characters $C_i$, where i=1 through n;
   identifying, in a second description, a sequence of n terms, $T2_1, T2_2 \ldots T2_n$; and
   determining that term T1 and terms $T2_1, T2_2 \ldots T2_n$ are a candidate pair if each $C_i$ matches the first letter of $T2_i$.

4. The computer-implemented method of claim 1, wherein calculating a score comprises:
   determining a first frequency with which the candidate pair occurs within the list;
   determining a second frequency with which one half of the candidate pair occurs within the list; and
   calculating a score based on a ratio of the first frequency and the second frequency.

5. The computer-implemented method of claim 1, further comprising excluding any candidate pair with a frequency of occurrence in the list below a defined threshold.

6. The computer-implemented method of claim 1, further comprising excluding any candidate pair wherein one half of the candidate pair contains a misspelled term.

7. The computer-implemented method of claim 1, further comprising excluding any candidate pair wherein it is determined that one half of the candidate pair is an alternative rather than an equivalent for the second half of the candidate pair.

8. The computer-implemented method of claim 7, wherein the determination comprises:
   locating a collection of documents;
   identifying lists within the collection, wherein each list contains both halves of the candidate pair; and
   determining that one half of the candidate pair is an alternative for the second half based on the frequency with which each half occurs in the lists.

9. The computer-implemented method for determining equivalent descriptions for an information need, comprising:
   identifying a plurality of descriptions that are associated with a plurality of information needs;
   identifying a candidate pair of equivalent descriptions by locating two descriptions that refer to the same information need;
   calculating a score for the candidate pair dependent on the frequency with which the candidate pair occurs in the plurality of descriptions; and
   determining that each of the candidate pair is an equivalent description for the information need if the score is above a defined threshold.

10. The computer-implemented method of claim 9 wherein the plurality of descriptions comprises an historical log of user queries.

11. The computer-implemented method of claim 10, further comprising sorting the log by user.

12. The computer-implemented method of claim 11, further comprising sorting the log by the time when the query was issued.

13. The computer-implemented method of claim 9 wherein identifying a candidate pair comprises:
   identifying two descriptions that contain a common term; and
   identifying as a candidate pair the terms not in common between the two descriptions.

14. The computer-implemented method of claim 9 wherein identifying a candidate pair comprises:
   comparing each letter of a term in a first description against the corresponding first letter of terms in a second description; and
   determining, based on the comparison, that the term in the first description and the corresponding terms in the second description are a candidate pair.

15. The computer-implemented method of claim 9 wherein calculating a score comprises:
   determining a first frequency with which the candidate pair occurs within the plurality of descriptions;
   determining a second frequency with which one half of the candidate pair occurs within the plurality of descriptions; and
   calculating a score based on a ratio of the first frequency and the second frequency.

16. The computer-implemented method of claim 9 wherein calculating a score comprises:
   determining a first frequency with which the candidate pair occurs within the plurality of descriptions;
   determining a second frequency with which one half of the candidate pair occurs within the plurality of descriptions;
   determining a third frequency with which the other half of the candidate pair occurs within the plurality of descriptions;
   calculating a score bases on a ratio of the first frequency and the smaller of the second and third frequencies.

17. A computer-implemented method for determining synonyms, comprising:
- obtaining a list of search queries issued by one or more users;
- sorting the list first by user and second by the time when the query was issued;
- selecting a set of adjacent queries for a single user;
- identifying, from the set, two queries that contain at least one query term in common;
- identifying as a candidate synonym pair the uncommon portions of the two queries;
- calculating a score for candidate synonym pair dependent on the frequency with which the candidate synonym pair occurs in the list; and
- determining that each half of the candidate synonym pair is a synonym of the other half if the score is above a defined threshold.

18. The computer-implemented method of claim 17, wherein calculating a score comprises:
- determining a first frequency with which the candidate synonym pair occurs within the list;
- determining a second frequency with which one half of the candidate pair occurs within the list; and
- calculating a score based on a ratio of the first frequency and the second frequency.

19. The computer-implemented method of claim 17, further comprising excluding any candidate synonym pair with a frequency of occurrence below a defined threshold.

20. The computer-implemented method of claim 17, further comprising excluding any candidate synonym pair wherein one half of the candidate synonym pair contains a misspelled term.

21. The computer-implemented method of claim 17, further comprising excluding any candidate synonym pair wherein it is determined that one half of the candidate synonym pair is an alterative rather than an equivalent for the second half of the candidate synonym pair.

22. The computer-implemented method of claim 21, wherein the determination comprises:
- locating a collection of documents;
- identifying lists within the collection, wherein each list contains both halves of the candidate synonym pair; and
- determining that one half of the candidate synonym pair is an alternative for the second half based on the frequency with which each half occurs in the lists.

23. A computer-implemented method for determining equivalent descriptions for an information need, comprising:
- creating a list of anchor text units;
- determining a subset of the list that refers to the same information need;
- locating, within the subset, two anchor text units that contain at least one term in common;
- identifying as a candidate pair of equivalent descriptions the uncommon portions of the two anchor text units;
- calculating a score for the candidate pair dependent on the frequency with which the candidate pair occurs in the list; and
- determining that each half of the candidate pair is an equivalent description for the information need if the score is above a defined threshold.

24. An apparatus for determining equivalent descriptions for an information need, comprising:
- means for identifying a list of queries issued by one or more users;
- means for identifying a candidate pair of equivalent descriptions by locating two queries that refer to the same information need;
- means for calculating a score for the candidate pair dependent on the frequency with which the candidate pair occurs in the list; and
- means for determining that each half of the candidate pair is an equivalent description for the information need if the score id above a defined threshold.

25. An apparatus for determining equivalent descriptions for an information need, comprising:
- at least one memory having program instructions, and
- at least one processor configured to execute the program instructions to perform the operations of:
- identifying a list of queries issued by one or more users;
- identifying a candidate pair of equivalent descriptions by locating two queries that refer to the same information need;
- calculating a score for the candidate pair dependent in the frequency with which the candidate pair occurs in the list; and
- determining that each half of the candidate pair is an equivalent description for the information need if the score is above a defined threshold.

26. The computer-implemented method of claim 1 wherein the list of queries is a list of previously submitted search queries.

27. The apparatus of claim 25 wherein the list of queries is a list of previously submitted search queries.

* * * * *